United States Patent Office 3,764,380
Patented Oct. 9, 1973

3,764,380
ELECTRODE HAVING A COATED POSITIVE
CONTACT SURFACE
Phillip A. Grossman, Lakewood, Colo., assignor to The
Gates Rubber Company, Denver, Colo.
No Drawing. Filed June 3, 1971, Ser. No. 149,793
Int. Cl. B44d 1/02, 1/34
U.S. Cl. 117—227
11 Claims

ABSTRACT OF THE DISCLOSURE

A positive electrode of the pasted or compressed powder type for an electrolytic cell and a process for its manufacturers is described, the electrode including in admixture an active mass, a conductive medium, and optionally a binder, the mixture being applied to a conductive collector/substrate. Any one or more of the active mass, conductive medium or collector/substrate or other positive contact surface carries a coating thereon formed by codepositing a selected metal e.g., nickel, with a material selected from phosphorus, sulfur, or their compounds. This codeposited alloy improves the overall corrosion resistance of the electrode giving it an improved cycle life and internal conductivity when incorporated into an electrolytic cell.

BACKGROUND OF THE INVENTION

This invention relates to electrodes for electrolytic cells, and especially relates to electrodes comprised of powder or paste affixed on a collector/substrate.

There are generally a number of metallic positive contact surfaces within a positive electrode structure which are susceptible to oxidation within the electrolytic cell environment. Such positive contact surfaces include the active mass which enters into the electrochemical reactions, the substrate onto which a mixture of the active mass is applied, and the conductive medium within the electrode. Another such contact surface includes a metallic coating applied to the active particulate mass for contact amplification with the conductive medium with which it is in admixture. (See for instance U.S. Pats, 2,678,343 and 3,305,401.)

Many types of electrolytic cells are characterized by an oxidative environment during cell operation. For instance, in an alkaline electrochemical cell, such as provided by the nickel/cadmium couple, sources of oxidation at the positive contact surfaces include substantial concentrations of nascent and molecular oxygen, hydroxyl ions and high valent nickel oxide. These oxidizing agents convert the contact surfaces to oxidized forms which are much poorer electrical conductors than their precursors. When a metallic coating on the active mass in the electrode is so oxidized, the resulting electrode exhibits a significantly lower discharge capacity and shorter cycle life.

It is a primary object of the present invention to overcome drawbacks of the prior art and to provide an electrode with a high resistance to oxidation and corrosion and which will provide high discharge voltages and excellent cycle life.

SUMMARY OF INVENTION

Briefly described, the invention includes the process of codepositing a metal selected from the group consisting of nickel, cobalt, iron and mixtures theerof with a material selected from the group consisting of phosphorus, sulfur, and their compounds on a positive contact surface of a positive electrode structure. Positive contact surfaces include the active particulate mass, conductive medium, collector/substrate, any combination of these, or any other surface in electrical contact with any of the foregoing.

According to one embodiment of the invention, the electrode is of the compressed powder type and comprises an active particulate mass in admixture with a conductive medium, the mixture being compressed upon a conductive collector/substrate under firm pressure. Any one or more of the active mass, conductive medium, collector/substrate or other positive contact surface has a coating thereon formed by codepositing a metal, such as nickel, with a material, such as phosphorus or nickel phosphide.

According to a further embodiment of the invention, the electrode is comprised of a conductive collector/substrate upon which is affixed a paste containing the active particulate mass in admixture with a conductive medium and a suitable binder. Again, any one or more of the positive contact surfaces of the electrode is provided with a codeposit or alloy of a metal, such as nickel, with a material such as phosphorus or nickel phosphide.

An example of an electrode made according to the invention is a pressed powder nickel electrode, useful in a variety of cells including nickel/cadmium and nickel-zinc rechargeable alkaline battery cells. These electrodes may be used as flat plates, spirally wound into cylindrical cells, or oriented in other configurations.

PREFERRED EMBODIMENTS OF THE INVENTION

(1) Positive contact surfaces

By positive contact surface is meant any component in the positive electrode, or any metallic surface in contact with a component of the electrode, which is subject to corrosion or oxidation during cell operation or during its shelf life. Examples of such surfaces are described below.

Electrodes of the invention generally employ on active mass in a finely divided particulate form, such as finely divided powder or crystals. Although not narrowly critical, it is preferred that the active particulate mass have an average particle size in the range of about 0.01 to 100 microns and more preferably from about 0.1 to about 50 microns. Any type of active mass may be employed which is capable of being incorporated into a pasted or compressed powder type positive electrode and compatible with the alloy coating hereinafter described. Illustrative examples of active masses useful in the invention include oxygen compounds of nickel (e.g., nickel hydrate and nickel hydroxide), manganese oxides, lead oxides, silver oxides, mercuric oxides, compatible mixtures thereof, and the like. This active mass may also be provided with a porous metallic coating for amplified contact such as described in U.S. Pat. No. 3,305,401. The alloy coating of the present invention (hereinafter described) provides the benefit of such amplified contact together with significantly improved corrosion resistance.

To provide the necessary electrical conductive link between the active mass and current collector (either or both of which may carry the alloy coating according to the invention), a conductive medium is admixed with the active mass to provide intimate electrical contact at a number of contact points on the active mass particles (or metal coated active mass particles). This conductive medium should possess good electrical conductivity and generally be in the form of a powder or fibers which will blend with the active mass. Examples of such substances include metallic powders e.g., of nickel and iron, graphite fibers, electrolytic iron and nickel, and the like. When preparing a pasted type electrode according to one embodiment of the invention, such pasting may be accomplished by the addition of a plastic polymeric material to the mixture of active mass and conductive medium. A suitable vehicle is also usually added, the mixture made pliant, and then applied to a substrate; the vehicle is later driven off.

Such a polymeric binding material is not required and may present drawbacks if employed in the powder pressed electrode embodiment, although may be employed if desired. However, it is often desirable in the powder pressed embodiment to employ small amounts of a reinforcing fiber, e.g., graphite, fibers or Dynell fibers, to provide the finished electrode with mechanical strength, to reduce spalling, and facilitate spiral winding of the electrode, if desired. Additionally, in both the pasted and pressed powder embodiments, it is often useful to incorporate minor amounts of an anti-polar mass (e.g. cadmium oxide) to prevent gassing in the event of a polarity reversal, such as might occur if the cell were over-discharged.

In addition to the active mass, conductive medium, polymeric binder, reinforcing fiber, or anti-polar mass, another positive contact surface which may be subject to oxidation or corrosion within the cell is the substrate. This substrate is preferably a good conductor and also serves as the current collector. Typical structures include the pocket plate, tube, thin sheet or flat grid structure such as woven wire screen, perforated sheet metal, etc., or expanded mesh. The electrode mixture is either compressed under firm stacking pressure or applied as a paste to the conductive substrate, which should additionally be compatible with the particular electrolyte used and should provide a long lasting base onto which the electrode mixture remains firmly in electrical contact, electrochemically active and reversible throughout the life of the electrolytic cell. The substrate may typically be made of iron, steel, nickel plated iron or steel, nickel, brass, silver, bronze, platinum, and paladium or compatible alloys thereof.

(2) Alloy coating

According to the invention, any one or more of the positive contact surfaces of the electrode is provided with an alloy codeposit of a metal selected from the group consisting of nickel, cobalt, iron or mixtures thereof with a material selected from the group consisting of phosphorus, sulfur, and their compounds, or compatible mixtures of any of the materials in this designated group. For example, any of the contact surfaces (e.g., collector substrate or active mass particles) may be provided with an alloy coating of elemental nickel and elemental phosphorus, or of elemental nickel and elemental sulfur, elemental cobalt and elemental phosphorus, elemental iron and elemental phosphorus, and the like. Oftentimes, these codeposits exist in the form of the metal alloyed with a compound of phosphorus or sulfur, such as nickel phosphide. The particular deposition process will determine what type of alloy results (e.g., two elemental materials or one elemental material with one compound or two elemental materials with one compound).

The amount of alloy coating deposited generally should be enough to provide the contact surface(s) with a uniform thickness of coating for maximum corrosion protection. As an exception however, in alloy coating the active particulate mass, it is necessary that the coating be porous to allow the active mass to enter into the electrode reactions. When active mass particles are in the range of sizes previously discussed herein, e.g. from about 0.01 to 100 microns, most deposition processes will automatically provide a coating of a reticulated or matrix type as desired, rather than a continuous, thoroughly covered coat.

The alloy coating will preferably contain from about 80 to about 99 and more preferably from about 85 to about 97 weight percent of the metal component (e.g., nickel). Those skilled in the art will appreciate the various combinations and percentages of components of the alloy coating. Oftentimes a balance will have to be struck between maximum conductivity (high metal content) and maximum corrosion resistance (e.g., phosphorus content).

Deposition of the alloy will generally occur quite readily on catalytic surfaces, e.g., metallic surfaces. In some instances, when the positive contact surface is non-catalytic in nature, it may be necessary to first seed the surface with a catalytic metal such as palladium chloride. However, many types of non-metal surfaces, such as nickel hydrate (a preferred active particulate mass), require no seeding to initiate deposition.

(3) Method of alloy deposition

Various method of deposition may be employed. Examples include electrodeposition, (e.g., see U.S. Pat. No. 2,643,221 to Brenner et al.), vacuum deposition, electroless metal plating, by other types of immersion plating, or by spray deposition, and the like. For illustrative purposes, the method of electroless metal plating with nickel will be described hereafter in more detail. Two references treating the subject of electroless metal deposition which are instructive are the following:

(1) "Symposium on Electroless Nickel Plating," A.S.T.M. Special Technical Publication No. 265, University Microfilm: England, 1959.

(2) "Studies on Chemical Reduction on Nickel and Cobalt by Hypophosphite," Electrochim. Metal., III, 3, 1968.

A positive contact surface may be electrolessly plated by immersing the surface in a bath containing an aqueous solution of a nickel salt and a reducing agent containing the element to be codeposited, such as hypophosphorus acid or a salt thereof which provides the hypophosphite anion in solution. In this manner, the nickel cation is reduced and electrolessly plated on the contact surface immersed in the bath. The electroless nickel deposit is actualy an alloy generally containing from about 3 to about 15% by weight of phosphorus. The phosphorus content of the chemically reduced nickel-phosphorus alloys is mainly influenced by pH of the bath, concentration of nickel salt and hypophosphite ion, and complexing agents. The tendency of nickel to incorporate non-metallic elements other than phosphorus is well known. For instance, sulfur can be codeposited to a great extent from thiosulfates.

Various types of plating baths may be used, including the widely used acid (pH 4-7) and ammoniacal (pH 8-11) baths. Alkaline baths containing pyrophosphate ion may be employed and permit deposition at a lower temperature than conventional baths. A typical bath composition would include 30 parts of a salt of nickel, such as nickel chloride or nickel sulfate, 10 parts sodium hypophosphite or other suitable reducing agent, and a salt of an organic acid. This latter component acts as a buffer in maintaining the pH of the bath at the proper level as well as to act as a complexing agent for nickel, preventing the precipitation of nickel phosphite, which would be detrimental to the stability of the bath. Examples of such organic acids include hydroxyacetic acid and lactic acid, present in a proportional amount of about 35 parts.

In addition to pH controlling agents and complexing agents, other type of bath additives for electroless nickel plating include inhibitors, exemplified by small concentrations of cadmium, lead, and thiocyanate; stabilizers, exemplified by molybdenum trioxide, arsenic, antimony, and bismuth in concentrations of 0.1 to 100 p.p.m.; exaltants, exemplified by fluoride ion, acetic and propionic acids; and brighteners, exemplified by organic brighteners such as sodium benzenedisulfonate, glue, boric acid, and ammonium salts.

Temperature is usualy an important parameter in determining the deposition rate of the alloy. A preferred temperature in depositing electroless nickel is in the range of from about 90° C. up to the boiling point of the bath solution. Furthermore, the uniformity of the deposition may be controlled by agitation. Good agitation will usually insure a uniform nickel ion distribution. Where a lattice or reticulated structure is desired rather than a continuous covering, less agitation should be employed.

While it is not entirely understood what the composition of the electrolessly deposited nickel phosphorus alloy is, it is believed to be a mixture of elemental nickel with phosphides or phosphorus, or mixtures thereof. Some believe the chemically reduced nickel alloys to be supersaturated solid solutions of phosphorus dissolved in crystalline nickel. Others believe the deposit to be a mixture of nickel plus phosphorus in equilibrium with the system of nickel plus nickel phophide. It is not intended that the present invention be limited to any one or more of these particular theories of composition, but applies generally to a process of codepositing certain metals with phosphorus, sulphur, and a variety of compounds thereof.

(4) Modification of the invention

It should be understood that the invention is capable of a variety of modifications and variations which will be made apparent to those skilled in the art by a reading of this specification. All such modifications, variations and other equivalents are to be included within the invention as defined by the claims appended hereto. For instance, while the deposition process and baths were particularly directed to electroless nickel chemical-type plating baths, those skilled in the art will readily appreciate the applicability of these processes to the codeposition of cobalt and iron with any of phosphorus, sulphur, or their compounds. Electroplating and other types of deposition may also be used satisfactorily and are within the scope of the invention. Furthermore, contact surfaces other than those heretofore enumerated would include any metallic surface in contact with the collector/substrate, for instance. Thus, a current collector table extending from the substrate to the wall or top of a battery container would advantageously receive an alloy coating according to the present invention. Furthermore, the wall or top of the battery container to which the tab is welded would also be considered a contact surface and oxidation resistance would be improved by depositing thereon an alloy coating according to the invention.

What is claimed is:

1. In a process for the preparation of a positive electrode for use in an alkaline electrochemical cell operating in an oxygen containing oxidizing environment, said electrode having a substrate upon which is affixed a mixture of an active particulate mass and a particulate conductive medium, the improvement comprising codepositing nickel and phosphorus as a porous reticulated matrix on the active particulate mass.

2. The process of claim 1 wherein the nickel/phosphorus deposit is formed by immersing the active particulate mass in a bath containing an aqueous solution of a nickel salt together with hypophosphorus acid or a hypophosphite.

3. The process of claim 1 wherein the nickel/phosphorus deposit is formed by any one of the group of processes known as electroless nickel plating, electroplating, vacuum deposition and spray deposition.

4. The process of claim 2 wherein the temperature of the bath is maintained in the range from about 90° C. to the boiling point of the bath.

5. A positive electrode composition of the compressed powder type comprising:
   (a) an active particulate mass having an average particle size in the range of 0.01 to 100 microns in admixture with
   (b) a particulate conductive medium,
   (c) said mixture compressed upon a conductive substrate under firm pressure, said active particulate mass carrying a porous, non-continuous reticulated coating thereon formed by codepositing a composition comprising principally (1) a metal(s) selected from the group consisting of nickel, cobalt and iron, or mixtures thereof, with (2) a material(s) selected from the group consisting of phosphorus, sulfur, and compounds thereof and compatible mixtures of any of this group.

6. The electrode composition of claim 5 wherein said active particulate mass has an average particle size in the range of 0.1 to 50 microns.

7. A process for the preparation of a nickel cathode for use in an alkaline electrochemical cell containing an oxidizing agent which has elemental oxygen as an element thereof, said cathode comprising an active particulate nickel mass having an average particle size in the range from 0.01 to 100 microns and a conductive medium affixed to a conducting substrate, said process comprising codepositing in a reticulated manner on said active particulate nickel mass (a) a metal selected from the group consisting of nickel, cobalt, iron or mixtures thereof, with (b) a material selected from the group consisting of phosphorus, sulfur, and compounds or mixtures thereof to form an electrode having an active mass whose surface bears a porous, non-continuous reticulated conductive coating.

8. The process of claim 7 wherein the average particle size of said active nickel mass is in the range of 0.1 to 50 microns.

9. The process of claim 7 wherein nickel and phosphorus are the codeposited species the nickel being present in the amount of 80 to 99 weight percent.

10. A process for the preparation of a nickel cathode for use in electrochemical cell containing an oxidizing agent which has elemental oxygen as an element thereof, said cathode comprising an active particulate nickel mass and a particulate conductive medium affixed to a conductive substrate, said process comprising codepositing on said particulate conductive medium (a) a metal selected from the group consisting of nickel, cobalt, iron or mixtures thereof, with (b) a material selected from the group consisting of phosphorus, sulfur, and compounds or mixtures thereof to form an electrode whose particulate conductive medium bears a corrosion resistant coating thereon.

11. The process of claim 10 wherein said active particulate mass has an average particle size in the range from 0.01 to 100 microns, said active particulate mass bearing a reticulated codeposited thereon of (a) a metal selected from the group consisting of nickel, cobalt, iron or mixtures thereof, with (b) a material selected from the group consisting of phosphorus, sulfur, and compounds or mixtures thereof.

References Cited
UNITED STATES PATENTS

| 3,619,288 | 11/1971 | Sirti | 117—227 |
| 3,607,389 | 9/1971 | Carnegallo | 117—227 |
| 3,586,534 | 6/1971 | Nitta et al. | 117—227 |
| 3,577,276 | 5/1971 | Edge | 117—227 |
| 3,573,992 | 4/1971 | Grubb et al. | 117—130 R |
| 3,490,314 | 1/1970 | Calnan | 117—130 R |
| 3,485,597 | 12/1969 | Pearlstein | 117—130 R |
| 3,305,401 | 2/1967 | Aulin | 136—28 |

ALFRED L. LEAVITT, Primary Examiner

M. F. ESPOSITO, Assistant Examiner

U.S. Cl. X.R.

117—100 R, 100 M, 230, 231; 136—25, 26, 27, 28, 29, 75, 76